US010862520B1

(12) United States Patent
Bloechl

(10) Patent No.: US 10,862,520 B1
(45) Date of Patent: Dec. 8, 2020

(54) APPARATUS AND METHOD FOR MITIGATING EFFECTS OF MULTIPATH INTERFERENCE BETWEEN WIRELESS COMMUNICATION NODES VIA CONSTRAINT OF ESTIMATED NODE LOCATION

(71) Applicant: Link Labs, Inc., Annapolis, MD (US)

(72) Inventor: Mark O. Bloechl, Elkridge, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 16/911,755

(22) Filed: Jun. 25, 2020

(51) Int. Cl.

| | |
|---|---|
| ***H04B 1/10*** | (2006.01) |
| ***H04W 4/38*** | (2018.01) |
| ***H04B 17/345*** | (2015.01) |
| ***H04B 1/71*** | (2011.01) |
| ***H04W 24/08*** | (2009.01) |

(52) U.S. Cl.
CPC ......... *H04B 1/1081* (2013.01); *H04B 1/7101* (2013.01); *H04B 17/345* (2015.01); *H04W 4/38* (2018.02); *H04W 24/08* (2013.01)

(58) Field of Classification Search
CPC .. H04B 1/1081; H04B 17/345; H04B 1/7101; H04W 4/38; H04W 24/08
See application file for complete search history.

(56) References Cited

U.S. PATENT DOCUMENTS

| | | | | |
|---|---|---|---|---|
| 6,430,216 | B1 * | 8/2002 | Kober | H01Q 3/2605 370/342 |
| 8,270,969 | B1 * | 9/2012 | Khanka | H04W 64/00 455/434 |
| 8,837,558 | B1 * | 9/2014 | Rao | G01S 5/14 375/152 |
| 10,218,408 | B1 * | 2/2019 | Shaffer | H04B 7/18513 |
| 2002/0183071 | A1 * | 12/2002 | Shioda | G01S 5/0273 455/456.1 |
| 2007/0075899 | A1 * | 4/2007 | Inaba | H04W 64/00 342/387 |
| 2009/0310654 | A1 * | 12/2009 | Ahmed | G01S 19/30 375/150 |
| 2012/0129550 | A1 * | 5/2012 | Hannan | H04W 64/00 455/456.1 |
| 2014/0269389 | A1 * | 9/2014 | Bukkfejes | G01S 3/48 370/252 |
| 2018/0321687 | A1 * | 11/2018 | Chambers | G05D 1/0274 |
| 2019/0271775 | A1 * | 9/2019 | Zhang | H04W 4/38 |

* cited by examiner

*Primary Examiner* — Janice N Tieu
(74) *Attorney, Agent, or Firm* — Charles B. Lobsenz; Brian H. Buck; Potomac Law Group, PLLC

(57) ABSTRACT

Provided are a wireless communications node (WCN) and a method therefor achieving mitigation of multipath interference via optimized estimation of coordinate location of the WCN relative to wireless communications with a plurality of reference points (RPs). To do so, the WCN effects a constrained gradient descent with respect to phase ranging measurements to one or more of the plurality to minimize a cost of error associated with the obtaining of such measurements.

26 Claims, 10 Drawing Sheets

As to 720

As to 730 and 740

As to 750

APPARATUS AND METHOD FOR MITIGATING EFFECTS OF MULTIPATH INTERFERENCE BETWEEN WIRELESS COMMUNICATION NODES VIA CONSTRAINT OF ESTIMATED NODE LOCATION

FIELD OF THE DISCLOSURE

Disclosed embodiments relate to wireless communications, and more specifically, to narrowing an estimation of a location of one or more wireless nodes in the presence of multipath interference so as to enable optimized communication among the nodes and association of the nodes with items, tasks, and pertinent applications with which one or more of the nodes may be employed.

BACKGROUND

As wireless communications increasingly support applications within and for the Internet of Things ("IoT"), the reliability of devices that implement those communications and provide the information to be drawn therefrom has become a continuing focus of optimization.

Such focus exists for many reasons, including, but not limited to, achievable device miniaturization, diversity, processing capacity, energy efficiency, and adaptability of/for use in a particular task. Whether a particular device may be effective in carrying out such a particular task is often a function of whether it is equipped to accommodate, i.e., overcome, commonly encountered impingements on the efficacy of its wireless communication ability.

One such impingement to be addressed is that of multipath during the course of radio frequency (RF) signal exchange between wireless devices, irrespective of the protocol governing such exchange. Put simply, multipath may be understood as the wave propagation of an RF signal that reaches its destination by a direct path and an indirect path. The indirect path may be caused by reflection resulting from, for instance, physical structure interposed between the source of the signal and the destination. As a result of such directional variance in the travel paths of constituent waves, one or more portions thereof may arrive at their destination out of phase with each other due to multipath interference.

Due to this interference, data carried or embodied by the signal may be corrupted, and thus reliance on that data may be impaired.

Depending on the task at hand, such corruption may entirely impede any ability to execute the task.

In the IoT context, wireless devices may often be used to discern a tracked or trackable location of an item, person or other object, whereby knowledge of such location is inherently valuable and such value is monetarily or otherwise derived. To discern the aforementioned location, the location of an associated end node may be communicated to an intended recipient, based on a relative location of a reference point.

Thus, it would be desirable to maximize the accuracy with which the associated end node may determine its location even when multipath interference may be present, and to do so with increased efficiency in the calculation of that determination.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An embodiment may include a wireless communications node (WCN), including one or more processors configured to execute a set of instructions including determining, based on phase measurement samples corresponding to signals exchanged between the WCN and a plurality of other wireless communications nodes, a range estimation of the wireless communications node to each of the plurality, generating range correlation curves (RCCs) respectively representing the range estimations, determining, based on the RCC for each of the plurality, a respective maximum range of the WCN to a respective one of the plurality, determining, based on the RCC for each of the plurality, an estimated true range of the WCN to a respective one of the plurality, wherein each maximum range comprises a magnitude that exceeds each estimated true range, generating, based on coordinate information corresponding to each of the plurality at a respective maximum range thereof, a location zone comprising the estimated true ranges to each of the plurality, and determining a coordinate location of the WCN within the location zone that corresponds to the estimated true ranges to each of the plurality.

Another embodiment may include a method of locating a wireless communications node, including receiving, at a first wireless communications node, beacon advertisement messages, each of which is transmitted from a respective one of a plurality of second wireless communications nodes, generating, at the first wireless communications node, range correlation curves (RCCs) each representing phase measurement samples versus estimated range as to wireless communications signals exchanged between the first wireless communications node and the plurality subsequent to receipt by the first wireless communications node of the beacon advertisement messages, determining, based on the RCC for each of the plurality, a respective maximum range of the first wireless communication node to a respective one of the plurality, determining, based on the RCC for each of the plurality, an estimated true range of the first wireless communications node to a respective one of the plurality, wherein each maximum range comprises a magnitude that exceeds each estimated true range, generating, based on coordinate information corresponding to each of the plurality at a respective maximum range thereof, a location zone comprising the estimated true ranges, and determining a coordinate location of the first wireless communication node within the location zone that corresponds to the estimated true ranges.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
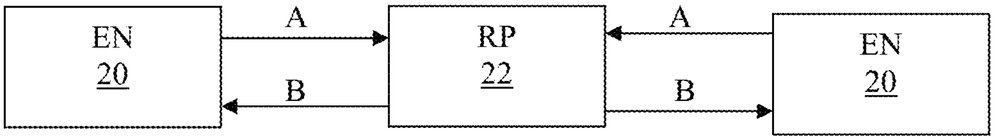
FIG. 1 is an illustration of wireless communications between a reference point (RP) and an end node (EN) in which the EN transmits a beacon advertisement message to be detected by the RP.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

Herein, the term "range" is used to mean "separable" or "separated" distance.

Figure 2:
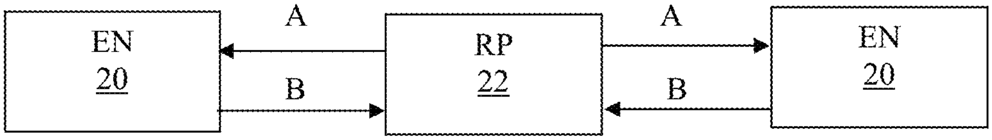
FIG. 2 is an illustration of a reversal of wireless communications between the RP and EN of FIG. 1 in which the RP transmits a beacon advertisement message to be detected by the EN.

Referring to FIGS. 1 and 2 and in the context of radio frequency (RF) communications between wireless communications nodes, RF signals may be transmitted between such nodes on various channels within and across a given frequency band. The communications may occur according to applicable protocol including, but not limited to, BLUETOOTH LOW ENERGY (BLE). When executing those communications, a beacon advertisement message setting forth parameters for the communications may be transmitted by either one or more first or mobile wireless communication end nodes (EN) 20, as indicated by arrows "A", and acknowledged by a second wireless communication node or stationary reference point (RP) 22, as indicated by arrows "B," that may or may not be connectable to a network, see FIG. 1. Alternatively, and as is shown in FIG. 2, such a beacon advertisement message may be transmitted by the RP 22, as indicated by arrows "A," and acknowledged by one or more ENs 20. In either case, the beacon advertisement message provides information enabling the initiation and establishment of wireless communications among the EN 20 and, for example, the RP 22. In these ways, the roles of an EN 20 and a RP 22 may be reversed, relative to the described alternative operations of FIGS. 1 and 2.

As will be understood, each of EN 20 and RP 22, in conjunction with their constructions as detailed herein, may be configured with all appropriate software and/or hardware, including one or more processors and storage which may be necessary for implementing their respective wireless communications, including their transmission, receipt and processing of information to determine parameters, constructions and quantities as discussed herein.

Throughout such communications, and the constituent transfer of RF signals between the EN 20 and RP 22, according to FIG. 2, for example, at least one of the EN 20 and RP 22 may cause the transfer to occur according to a frequency hopping regime or map to avoid multipath interference. While such interference may not be able to be entirely eliminated, embodiments herein contemplate mitigating such interference by causing the hopping to occur among, for example, channels that are less congested than others due to decreased interference. To do so, the EN 20 or RP 22 from which the beacon advertisement originated may employ a frequency hopping map enabling the hopping to occur on duplicates of the otherwise congested channel. Congestion may be confirmed as the EN 20 compares, relative to a predetermined threshold, IQ or quadrature samples of signaling between the EN 20 and the RP 22, and wherein I represents the amplitude an in-phase carrier, and Q represents the amplitude of a quadrature phase carrier. Should the congestion due to multipath interference still remain, such a congested channel may be discarded, and an alternative frequency hopping map may be implemented in which a value for the hop across the still congested channel is interpolated from among adjacent channels. Whether there exists a need for the aforementioned duplicate substitution and/or interpolation depends on the EN 20 conducting a measurement of a change in phase between sampling of the EN's signal as performed by and returned to the EN 20 by the RP 22 and sampling of the RP's return signal by the EN 20. Resulting from the aforementioned duplication and/or interpolation is a phase measurement which may be derived as the product of the returned EN 20 sampling, as performed by the RP 22, and the RP 22 sampling conducted by the EN 20. Such a product may thus be regarded as a measurement of phase that is substantially free of frequency and phase offset, and thereafter used to determine a physical range or distance between the EN 20 and the RP 22. See U.S. Patent Application Publication No. 2020/0113006 A1, which is assigned to the assignee of the present application and incorporated herein by reference in its entirety, for a more complete discussion of IQ sampling, albeit with respect to the appendage of Constant Tone Extension (CTE).

Figure 3:
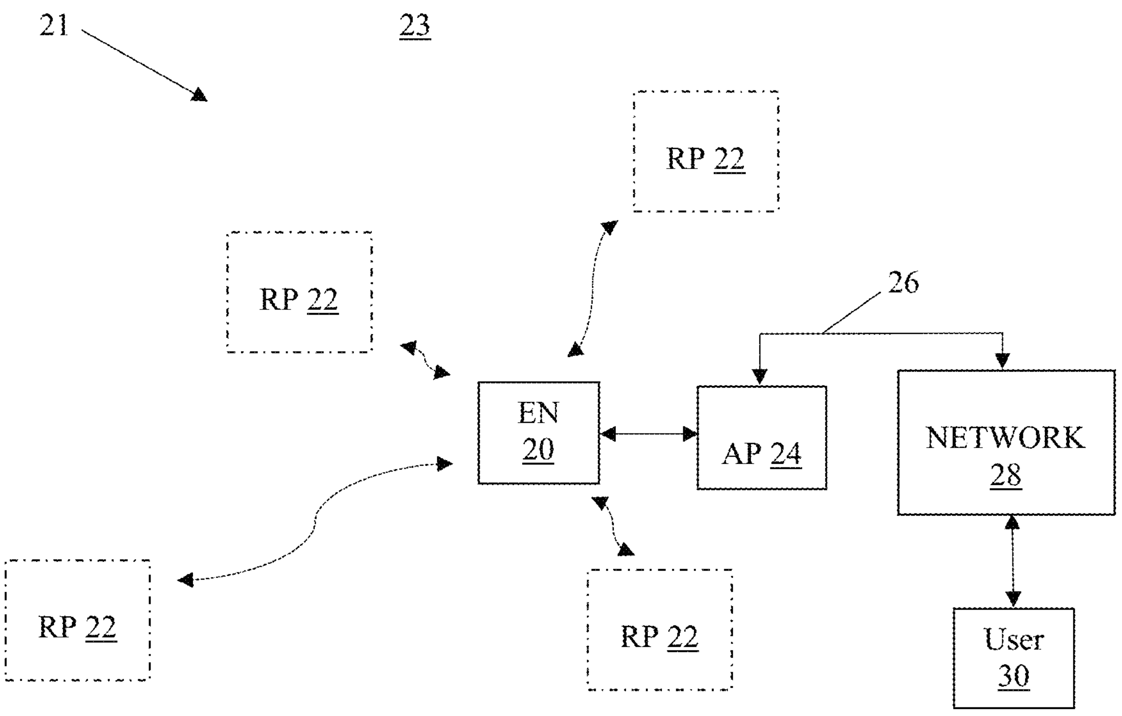
FIG. 3 is an illustration of an exemplary system of wireless communications among an EN and RPs of any of FIGS. 1 and 2, in which the EN is connectable to an access point (AP) for the transfer of information associated with the EN to a network and then to an end user.

Referring to FIG. 3, there is illustrated an exemplary system 21 for wireless communications. The system may include the EN 20 and optionally one RP 22 or a plurality thereof, including, but not limited to, four RPs 22, as shown. As discussed hereinbelow, the EN 20 may be configured to determine its range to one or more of the RPs 22, and based on that range, its coordinate location within a space 23 in which the EN 20 is operable. That is, the EN 20 may be configured to determine its location as the EN 20 moves throughout the space 23 and among each of the RPs 22 which are fixed to a given location. To do so, the EN 20 may be configured to derive such coordinate location based on each of coordinate locations respectively transmitted from a given RP 22 to the EN 20. Once determined, such coordinate location and contained information including sensory information, access information, notification information, alarm information, and any other status and/or content information thereof as may be applicable to its particular configuration may be transferred through an access point (AP) 24 and its backhaul 26, implemented by a cellular, WiFi, Low Power Wide Area Network (LPWAN) configuration, to a network or cloud service 28 for transfer to an end user terminal 30, such as a personal computing or other electronic device enabled to convey the aforementioned information. For instance, it is contemplated that EN 20 may be physically attached to and associated with an object for the transfer of any of the aforementioned types of information so as to be applicable to such environments including a workplace or other type of commercial environment in which commerce is a purpose, a residence, and a medical facility or other facility in which tracking of persons or objects is necessary and/or desired.

When engaging in the aforementioned communications, the EN 20 and a respective RP 22 may undertake to conduct sampling of those communications to derive a time of flight (ToF) measurement of the transmitted EN 20 RF signal and to measure any change in phase with respect to such signaling as between the EN 20 and the RP 22. To do so, the signaling may be sampled by each of the EN 20 and RP 22 in IQ format.

It will be understood that each of the EN 20 and RP 22 may be equipped with all of the necessary storage, hardware and/or software necessary for executing the aforementioned wireless communications, as well as the IQ sampling in connection therewith.

An EN 20 (or Node A as referred to in the equations below) may perform a scan within space 23 to detect those RPs 22 (or Nodes B as referred to in the equations below) for which signaling is receivable. Upon detection, the EN 20 may initiate a connection with the first detected RP 22, and transmit signaling in response to the beacon advertisement message received from the RP 22. In particular, one or more portions of the response signal, as transmitted, may be described by the following:

$e^{j(\omega_A t+\phi_A)}$, in which e is Euler's number, j is the square root of −1, ωA is the angular frequency of EN 20's signal, and φA is an arbitrary phase shift of EN 20's signal.

The response may then be received by the RP 22 as the following:

$e^{j(\omega_A t+\phi_A+\phi_{AB}(f,r))}$, in which $\phi_{AB}(f,r)$ is the phase shift introduced during propagation, given as a function of frequency (f) and range (r) by $\phi(f,r)=-2\pi fr/c$ where c is the speed of light.

Once the EN's response is received at the RP 22, the RP 22 may conduct its own IQ sampling of the response as transmitted by the EN 20, and store the IQ sampling. Thereafter, the RP 22 transmits that stored IQ sampling back to the EN 20 in the form of a data packet. With respect to a signal transmission, the EN 20 may correct for phase and frequency offsets, according to:

$e^{j((\omega_A-\omega_B)t+\phi_A-\phi_B+\phi_{AB})}e^{j(-(\omega_A-\omega_B)t-\phi_A+\phi_B+\phi_{AB})}=e^{j2\phi_{AB}(f,r)}=Z(f, r)$, in which Z represents the signal after being converted to complex baseband.

As a result, the EN 20 effectively receives both the RP's signal and the RP's IQ sampling of the EN's response, which is contained within that signal. Similar to the RP 22, the EN 20 conducts IQ sampling of the RP 20 signal, and decodes the data packet therein to obtain the RP's sampling of its own response signal which had been initially transmitted to the RP 22. That is, the EN 20 is now in possession of two sets of IQ sampling, including sampling of its response signal, as performed by the RP 22, as well as sampling of the RP 20 signal, as performed by the EN 20 on the RP's signal containing the RP's sampling of the EN's response signal.

Both sets of discrete IQ sampling may be stored by the EN 20 according to a same channel within the wireless band and a calculated ending phase of the RP signal. The ending phase may be calculated by the EN 20 according to the RP 22 transmitted data and based on a formula empirically determined from phase measurements of the chipset generating the transmitted signal. Said alternatively, the exchange, i.e., the transmission and receipt of data packets between the EN 20 and the RP 22, occurs without deviation among channels of the wireless band.

Once having accumulated the IQ samples across the wireless band, the EN 20 sorts those samplings into channel, or frequency, order.

Samples from each phase are then averaged over a configurable window. The corresponding samples from each phase are then multiplied together, for each channel. That is, averaged samples belonging to the EN 20 are multiplied by averaged samples belonging to the RP 22, for each channel. The resultant yield is a phase measurement sample, for example, Z(n) as referenced above, that is substantially free of phase and frequency offset for each channel.

A window according to, for example, Hanning or Blackman-Harris, may then be applied to the samples, which may then be zero padded to reach a power of two (2), nominally 128. Thereafter, an Inverse Fast Fourier Transform (IFFT) may be performed. A peak value (p), in the absence of multipath propagation, or when low multipath propagation may be experienced, may then be selected for use in determining the distance to the RP 22.

Figure 4:
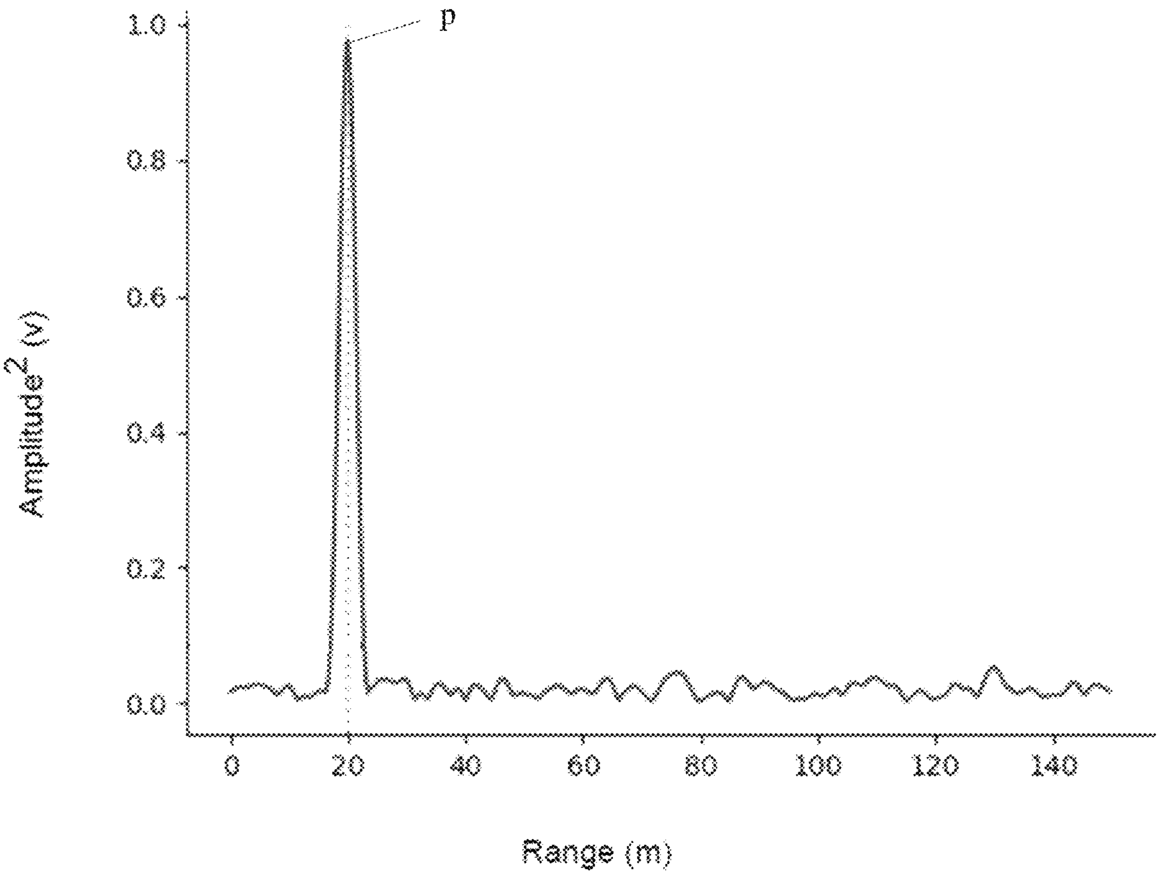
FIG. 4 is a chart showing a range correlation curve (RCC) of a true range of the EN of FIG. 3 during low multipath interference.

Referring to FIG. 4, there is shown a chart providing a range correlation curve (RCC) for an EN 20 response signal, in which the chart plots amplitude squared (in volts) versus range to the RP 22 (in meters).

Since the influence of multipath propagation may be absent or low in magnitude, the peak p of the chart may be taken as a true range of the EN 20 to one or more of the RPs 22. In this regard, the value of the peak p may be calculated according to the following:

r=(p*c)/(2*IFFT_LEN*CH_SPACING), in which p is the peak of the IFFT, c is the speed of light, IFFT_LEN is the number of samples in the IFFT, and CH_SPACING is the BLE channel spacing in Hz (nominally 2 MHz).

Here, it may be seen that the range, where the peak may be approximately 0.98 $v^2$, is about 20 m. The peak p may be referenced with regard to the observed noise floor (NF), i.e., the sum of all noise sources and unwanted signaling.

However, due to the influence of multipath which cannot be regarded as being absent or low in magnitude, i.e., when the aforementioned hop duplication and/or interpolation are necessary to implement, such true ranging may be obscured by various reflections and mixing products during hop processing.

Figure 5:
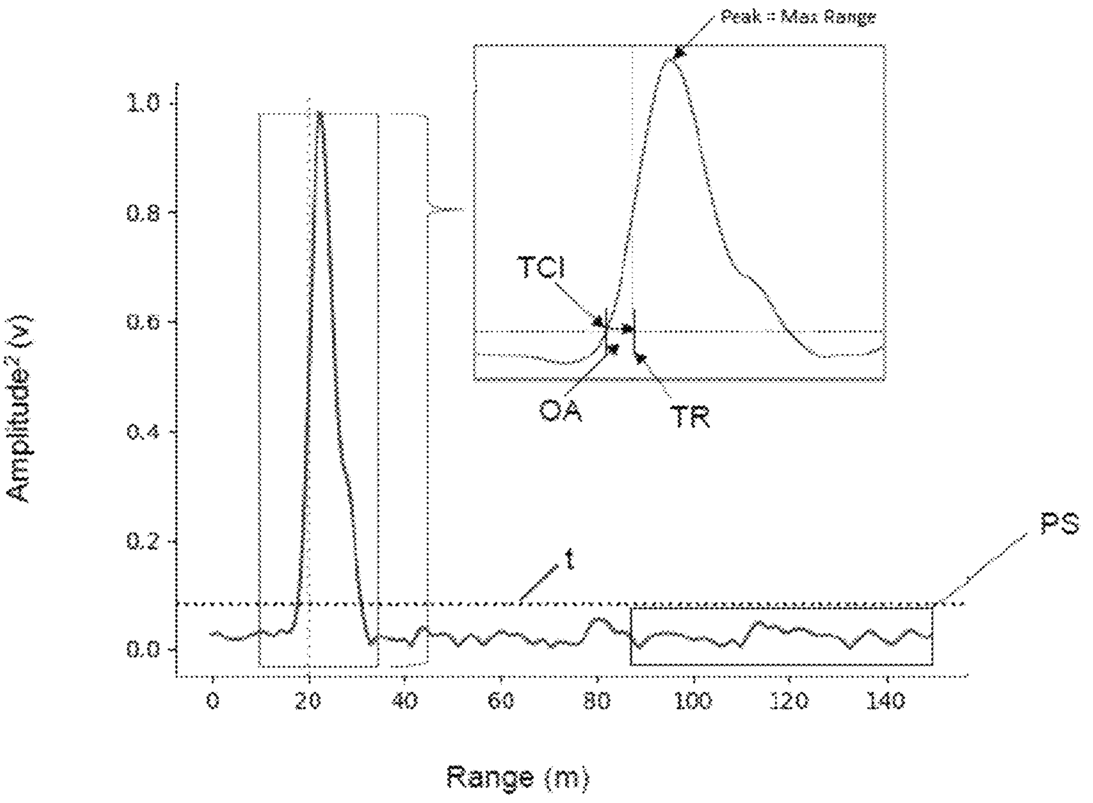
FIG. 5 is a chart showing a RCC according to embodiments herein.

Thus, with reference to FIG. 5, there is shown a RCC in which the influence of multipath is prevalent, such that when the aforementioned range of 20 meters is observed as a true range datum of the EN 20 relative to the RP 22, such true range does not coincide with or manifest as the peak of the monitored EN 20 signal as a result of multipath. Rather, the peak p becomes offset from the true range datum, and may be regarded as the EN's maximum range to the RP 22, i.e., the distance defining the outermost range limit that the EN 20 may be separated from the RP 22. In this regard, the maximum range may be understood as being defined by the peak amplitude according to a direct linear correspondence. For example, as shown in FIG. 5, the maximum range may be correlated to the peak at about 23 meters.

Because multipath may exist in a magnitude sufficient to skew the datum true range as shown in FIG. 4, it is then necessary to estimate an actual true range of the EN 20 to a respective one of the RPs that substantially removes multipath influence, i.e., results in the estimated true range substantially equaling the datum true range. Moreover, since the datum true range becomes skewed under the influence of multipath such that the peak p must be assigned as the maximum range, an estimated true range of the EN 20 may be determined via a threshold correspondence to the NF and an offset (described below).

In this way, and in order to remove corrupting influence of multipath so as to achieve the EN's estimated true range to a respective RP, the NF may be evaluated to establish a threshold therefor which accounts for multipath influence on the monitored EN 20 signal. The threshold may be established as $\alpha+(5\times\sigma)$, and indicated at "t," in which $\sigma$ and $\alpha$ respectively represent the standard deviation and maximum value of a predetermined number of samples (PS) within the RCC for the EN 20 signal. As an example, such predetermined number of samples may be, for example, at least 128, and the amount of standard deviation may likewise be otherwise configurable, i.e., predetermined, based on evaluation of the monitored EN 20 signal.

Once the threshold has been established, the EN may further reevaluate the RCC to first determine a threshold crossing index (TCI). That is, with exemplary reference to FIG. 5, the TCI may be defined and regarded as that portion of the RCC that first crosses the threshold t.

Since the estimated true range will, by definition, lay between the TCI and the maximum range, it is also therefore necessary to secondarily offset the TCI to compensate for windowing of each of the phase measurement samples corresponding to signals exchanged between the EN 20 and one or more RPs 22. To do so, an offset amount (OA) may be added to the TCI and variably determined based on the windowing of the aforementioned phase measurement samples derived from communications between the EN 20 and the RP 22. As such, the estimated true range in the presence of multipath may be comparatively the same as the datum true range given that the estimated true range may be determined as the sum of the TCI and the OA.

As an example, and upon inspection of FIG. 5, it may be seen that the TCI may be estimated at 17 meters, while the maximum range, when evaluated as the peak p of the RCC, corresponds to about 23 meters. Thus, assuming that the windowing function renders an OA of about 3 meters, the estimated true range may be regarded as being substantially equal to the datum true range of 20 m.

Based upon ranging to a plurality of the RPs 22 as shown in FIG. 3, for instance, the EN 20 is configured to determine its coordinate location with the space 23. In this regard, such coordinate location may be derived from the x,y,z, coordinates, i.e., position information, transmitted by each of the RPs 22.

To do so, the EN 14 may be equipped with any hardware and/or software enabling determination of its location within a three-dimensional space, such as space 23. Thus, through use of the known position information including coordinates $x_0$, $y_0$, $z_0$ to $X_3$, $y_3$, $Z_3$ transmitted to the EN 20 by each of the four (4) RPs 22 within space 23, the EN 20 may then undertake to minimize a cost of error associated with determination of each true range corresponding to a respectively determined maximum range. To minimize the cost of error, the EN 20 may calculate a constrained gradient descent according to the following:

$$\min_{\vec{x}\in\Omega} f(\vec{x}),$$

where $f(\vec{x})$ represents the sum of squared or absolute error associated with the EN's determined estimated true range to each of the RPs 22, and $\Omega$ represents the set of coordinates defining a boundary generated by the maximum ranges to each of the respective RPs 22. In this way, $\Omega$ may be generated by the EN 20 as a constraint volume defining a location zone LZ within which the coordinate location of the EN 20 will reside. During calculation, if the above minimization determines a coordinate location of the EN 20 as laying outside of the constraint volume $\Omega$, such location may be further recalculated so as to be re-projected onto the constraint volume $\Omega$.

Figure 6:
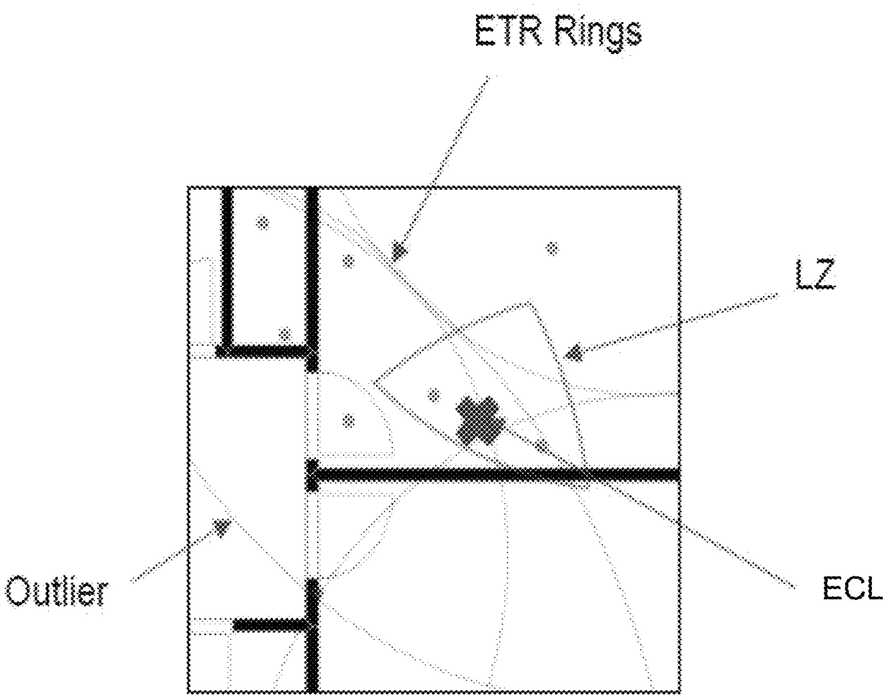
FIG. 6 is a schematic illustration showing a determination of a coordinate location of the EN of FIG. 3 according to embodiments herein.

Referring to FIG. 6, there is shown an illustrative floor plan depicting travel of the EN 20 (as indicated by the series of greyed dots) and the EN's range and coordinate location determinations as it moves about the floor plan and among the several RPs 22. During such movement, the graphical depiction(s) of FIG. 6 demonstrate the EN's estimation of its estimated true ranges to one or more RPs (not shown), via the shown estimated true range (ETR) rings. As shown, the rings expectedly aggregate within or through the constraint volume $\Omega$ in response to minimization of error associated therewith. As a result, the optimized coordinate location or estimated coordinate location (ECL) of the EN 20 may then be determined, as indicated in FIG. 6 Contrastingly, an inaccurate range determination, as an "Outlier" with respect to the constraint volume, may be discarded when arriving at the ECL.

Figure 7:
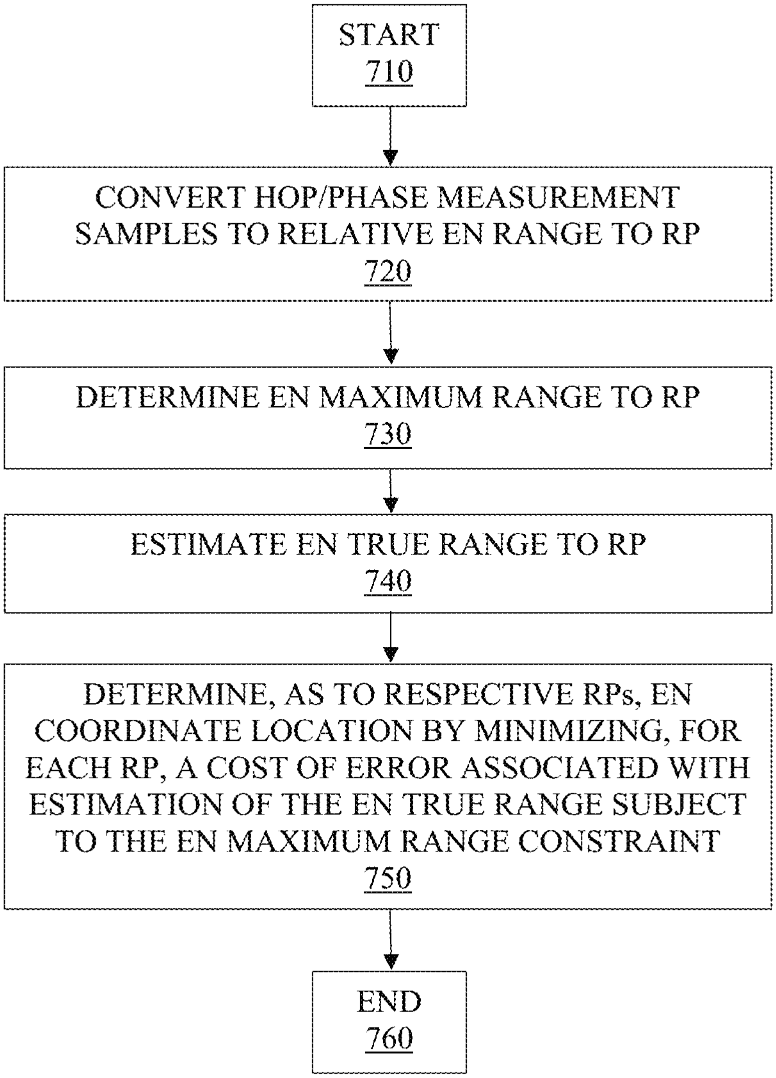
FIG. 7 is a high-level sequence diagram setting forth a manner of determining a coordinate location of the EN of FIG. 3 according to the RCC of FIG. 5.

Referring to FIG. 7, there is illustrated a high-level sequence diagram setting forth a manner in which the EN 20 may determine its coordinate location within the space 23 of FIG. 3. Beginning at 710, the EN 20 executes processing to, at 720, convert the EN's hop/phase measurement samples resulting from wireless communications among the EN 20 and the RP 22 to a relative range or distance to a respective RP 22. Once having acquired the relative range as at least a maximum range to the respective RP, the EN 20 undertakes generation of a RCC, as may be seen with respect to FIG. 5. Thereafter, the EN 20 evaluates the RCC to determine the peak p thereof, wherein, at 730, the EN 20 assigns the peak p as the maximum range of the EN 20 to the respective RP 22. Concurrently with such assignment, the EN 20 further evaluates the RCC, at 740, to determine its estimated true range to the respective RP 22. Once each of the maximum range and the estimated true range are determined with reference to the generated RCC, the EN 20 thereafter proceeds, at 750, to determine its coordinate location with space 23, for example, by minimizing, for each respective RP 22 from which it has received a beacon advertisement message, a cost of error associated with estimation of the true range subject to the maximum range constraint defined by the maximum ranges for each of the aforementioned RPs 22, before ending the process of FIG. 7 at 760. Though the EN 20 exemplifies a wireless communications node for executing each of operations 710-760, as described and according to FIG. 2, for example, it will be understood that such operations may also be performed by one or more an RP 22 or AP 24, with respect to movement of an EN 20, in a case in which wireless communications may occur according to FIG. 1, for example.

Figure 8:
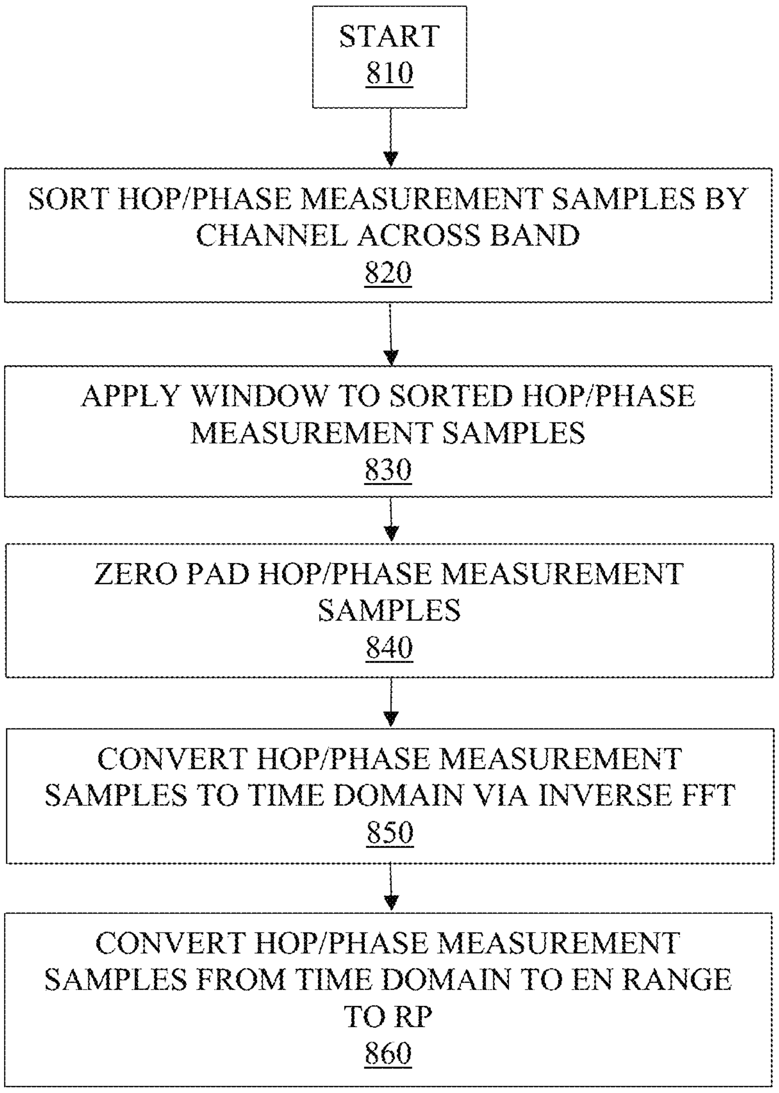
FIG. 8 is a sequence diagram setting forth a manner of conversion of EN hop/phase measurement samples to relative EN range to a respective RP of FIG. 3.

With reference to operation 720 above, FIG. 8 illustrates the process for converting hop/phase measurement samples to relative EN 20 range to a respective RP 22. Beginning at 810, the aforementioned samples are sorted by channel across the wireless band at 820. Then, the EN 20 applies windowing to the sorted samples at 830 prior to, at 840, subsequent zero padding. Throughout 850-860, the padded samples are first processed according to an IFFT prior to conversion to respectively determined ranges for one or more RPs 22, as discussed above.

Figure 9:
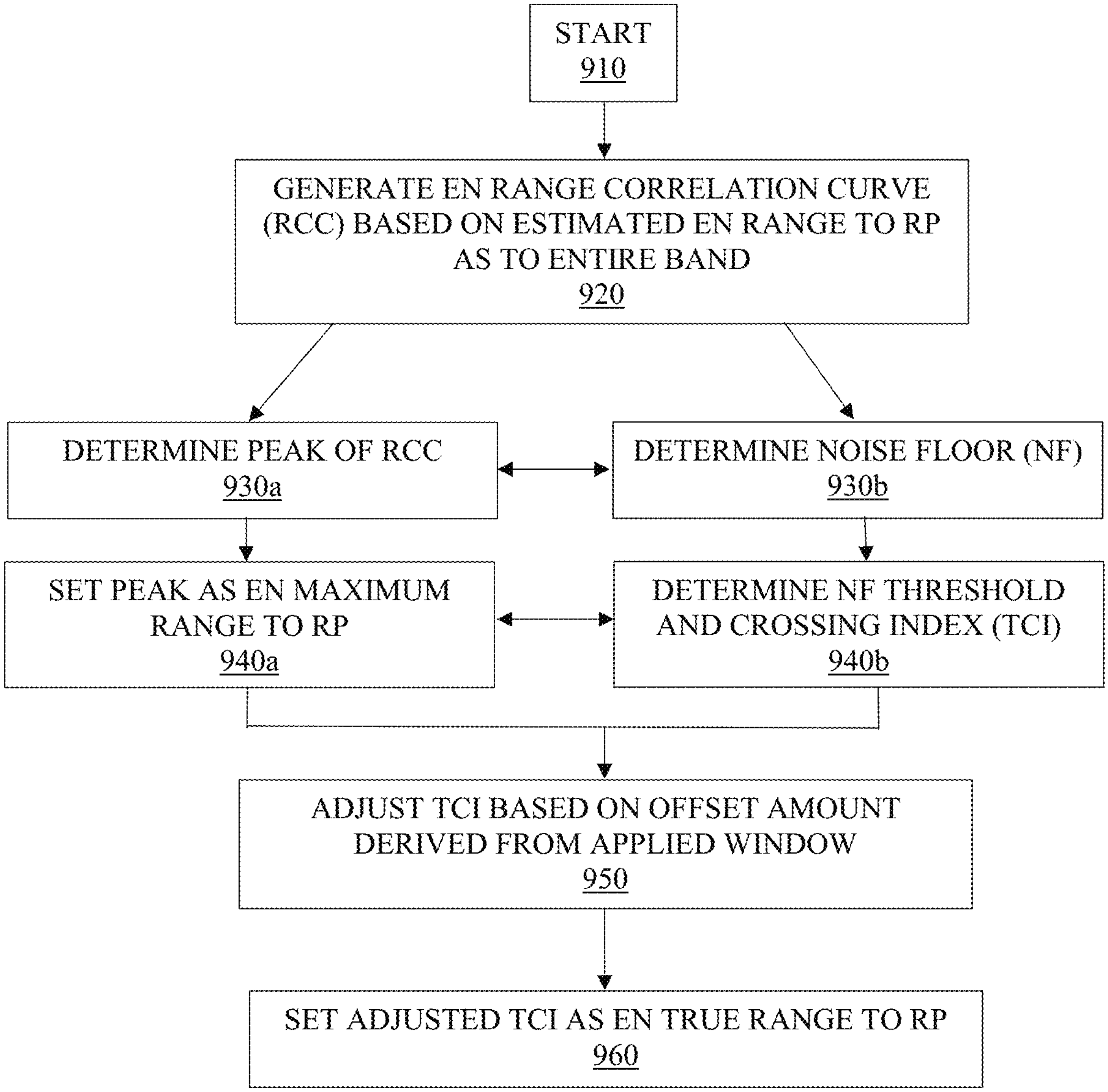
FIG. 9 is a sequence diagram setting forth a manner of determining both EN true and maximum ranges according to the RCC of FIG. 5.

With reference to operations 730-740 above, once the EN 20 has determined range to one more respective RPs, it generates a RCC like that which is illustrated in FIG. 5 based on the IFFT for each RP 22 from which it has received a beacon advertisement message, as is indicated in FIG. 9 at 910-920. Once generated, the EN 20 undertakes to evaluate the RCC to determine the peak p of the RCC and set the same as the EN's maximum range to the RP 22, as at 930*a*-930*b*. Concurrently, the EN 20 evaluates the RCC to determine an estimated true range between the EN 20 and each respective RP 22. To do so, the EN determines the noise floor (NF), its threshold, and threshold crossing index (TCI) as at 930*b* and 940*b* and as discussed above. With the TCI being established, the EN 20 thereafter adjusts the TCI, as at 950, by an offset amount (OA) to account for windowing of each of the phase measurement samples corresponding to signals exchanged between the EN 20 and one or more RPs 22. Subsequent to the adjustment, the EN 20 may then, at 960, set the adjusted TCI, i.e., the TCI in addition to the OA, as the EN's estimated true range, whereby, in doing so, effects of multipath on the EN's ranging efforts are mitigated.

Figure 10:
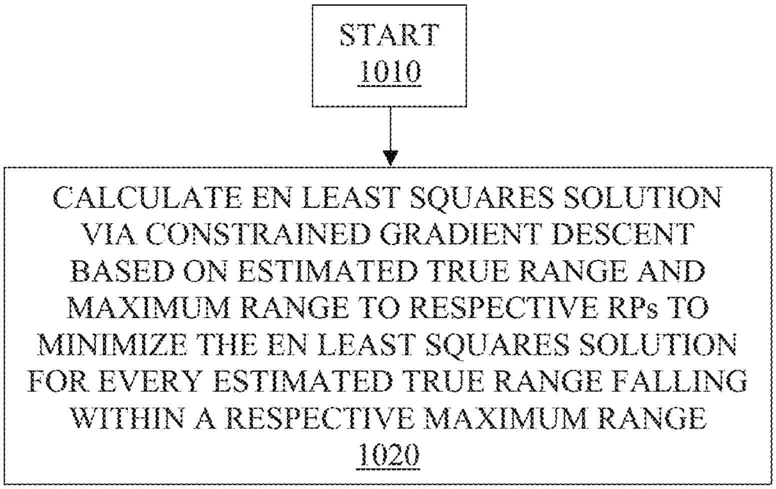
FIG. 10 is a sequence diagram setting forth a manner of determining a coordinate location of the EN of FIG. 3 according to the RCC of FIG. 5, wherein error associated with associated true and maximum ranges for each of respective RPs is minimized.

With reference to operation 750 above, and based on each of the true range and the maximum range to each respective RP 22 from which a beacon advertisement message has been received, the EN 20 may then further derive its own coordinate location by trilaterating among the known coordinates of each such respective RP 22. To do so, the EN 20 calculates, as is indicated in FIG. 10 at 1010-1020, an appropriate least squares solution via calculation of a constrained gradient descent based on the aforementioned true and maximum ranges. In doing so, the EN 20 minimizes the aforementioned solution for every estimated true range falling within a determined maximum range.

Figure 11:
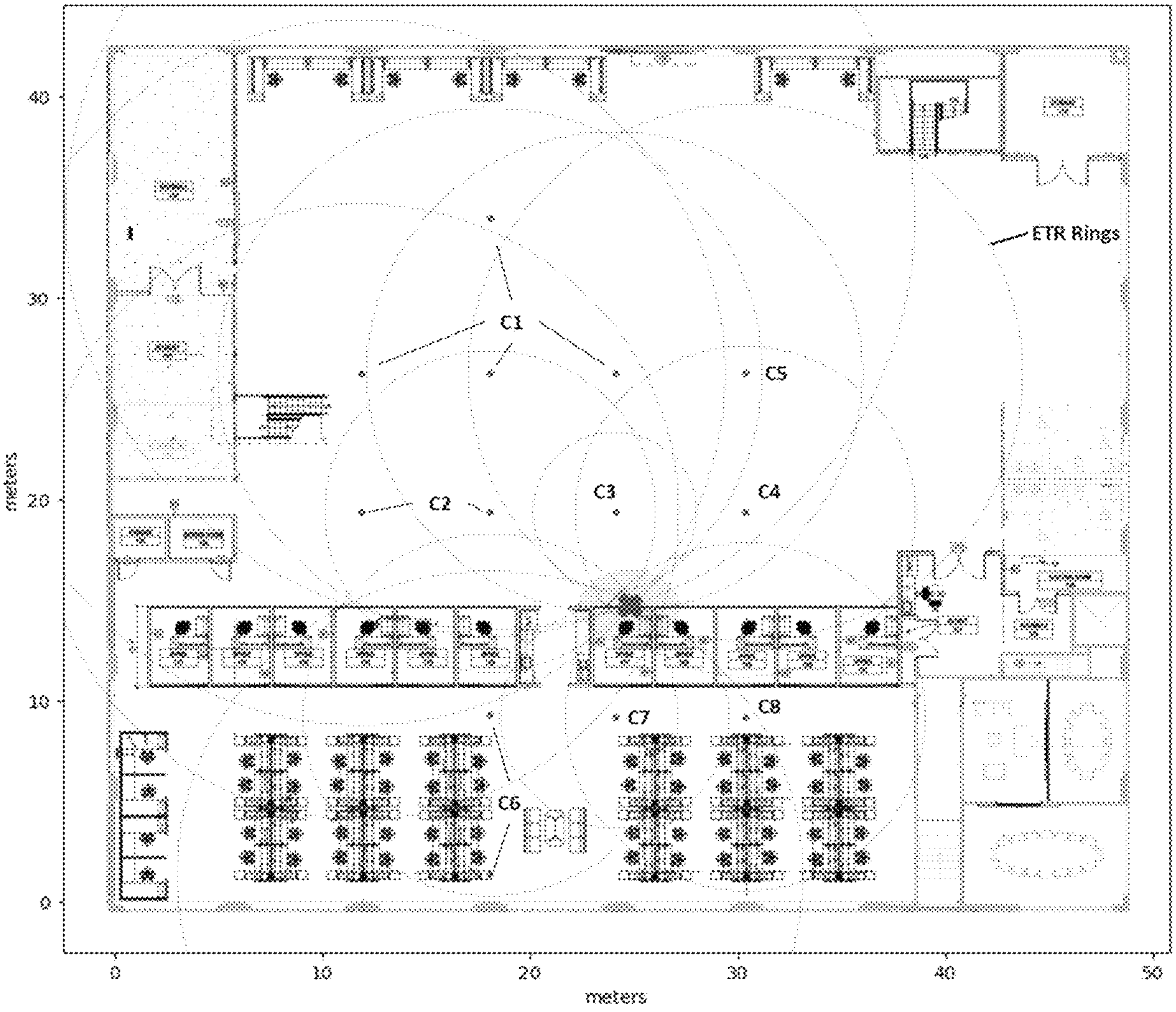
FIG. 11 is a schematic representation of an exemplary floorplan including an exemplary coordinate location of an EN with respect to such floorplan.

Referring to FIG. 11, there is shown a schematic representation of an exemplary floorplan including an exemplary coordinate location of an EN with respect to such floorplan. That is, the floorplan may be exemplary of space 23. As will be understood from embodiments described hereinabove, the EN conducts ranging to one or more RPs 22, included in clusters "C n" thereof," and develops its ETR Rings to subsequently determine its coordinate location at the location denoted by "X." In this way, it will be further understood that such coordinate location is derived with optimized efficiency enabling the determination of that location by an EN 20 that, as described above, may be reduced in size and enjoy longevity in battery capacity, when compared with EN's not configured according to present embodiments.

In one or more embodiments, the EN 20 may be configured to include an accelerometer. In such a case, the EN 20 may be further configured to impose the constrained gradient descent on already obtained coordinate location determinations in response to the EN not moving, i.e., being at a standstill. As such, continued application of the constrained gradient descent may occur wherein the EN 20 may update, i.e., swap out, previously obtained maximum ranges to RPs 22 for newly acquired maximum ranges wherein one or more of such newly acquired maximum ranges is lesser in magnitude. In this way, the constraint volume Ω, representing the location zone LZ containing respective RP 22 true ranging, may be further tightened or restricted so as to result in an EN 20 coordinate location having enhanced confidence, i.e., decreased margin of error.

When determining its ranging and coordinate location determination, it is to be understood that the EN 20 may employ not only a single set of RPs 22, but multiples thereof in order to more accurately evaluate its position in a three-dimensional space. In other words, the EN 20 may determine its coordinate location from among multiple sets of RPs 22 in which each set includes a plurality, and optionally four (4) RPs 22, which may or may not be exclusive to another set thereof. For example, first and second sets of RPs 22 may include ones which may be common to each other so long as one among those sets is not common to such first and second sets. In other words, the first and second sets of RPs 22 may be free of at least a shared RP, such that each of the first and second sets of RPs is a unique set thereof, by definition. Furthermore, should the communicating RPs 22 be arranged at a same height, i.e., at a same z coordinate, the EN 20 may execute a subsequent iterative, non-linear least squares calculation to arrive at its coordinate location relative to the communicating RPs 22.

As will be understood, although the EN 20 has been described as determining its coordinate location within space 23 as described herein, one or more of an RP 22 and an AP 24 may be likewise configured to carry out operations executed by the EN 20 when the one or more RP 22 and AP 24 is/are operable in an environment provided by FIGS. 1 and 3, such that one or more of the RP 22 and the AP 24 may be mobile and in receipt of beacon advertisement messages transmitted by a stationary EN 20.

In view of the above, it will be recognized that, by enacting each of the above maximum and estimated true range determinations, as well as the imposition of constrained gradient descent on coordinate determination, that the EN 20 realizes at least several below-described advantages affording a practical application of its processing.

First, and because the EN 20 optimizes its operation to substantially mitigate multipath interference, a size of the EN 20, resulting from a decreased need for unnecessary battery capacity, may otherwise be reduced when compared to such an EN 20 that is not equipped for such optimization. This is the case since, for example, unnecessary iterative measurement of ranging to a given RP 22 is reduced when determining an estimated true range. Said otherwise, ranging by the EN 20 may be empirically proven to be superior to another EN which is not equipped to operate as described herein. Furthermore, because ranging is optimized, determination of the EN's coordinate location is also optimized, thus avoiding the need for recalculation and commensurate increased battery capacity.

Second, and because the EN 20 optimizes its operation to substantially mitigate multipath interference as described herein, such aforementioned avoidance of iterative measurement of ranging and recalculation of coordinate location effects conservation of battery usage. As a result, the EN 20 experiences increased battery longevity so as to be available for more extended and varied applications such as those involved when tracking various types and amounts of resources.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A wireless communications node (WCN), comprising:

one or more processors configured to execute a set of instructions, comprising:

determining, based on phase measurement samples corresponding to signals exchanged between the WCN and a plurality of other wireless communications nodes, a range estimation of the wireless communications node to each of the plurality of other wireless communications nodes;

generating range correlation curves (RCCs) respectively representing the range estimations;

determining, based on the RCC for each of the plurality of other wireless communications nodes, a respective maximum range of the WCN to a respective one of the plurality of other wireless communications nodes;

determining, based on the RCC for each of the plurality of other wireless communications nodes, an estimated true range of the WCN to a respective one of the plurality of other wireless communications nodes, wherein each maximum range comprises a magnitude that exceeds each estimated true range;

generating, based on coordinate information corresponding to each of the plurality of other wireless communications nodes at a respective maximum range thereof, a location zone comprising the estimated true ranges to each of the plurality of other wireless communications nodes; and determining a coordinate location of the WCN within the location zone that corresponds to the estimated true ranges to each of the plurality of other wireless communications nodes.

2. The WCN of claim 1, wherein:

each maximum range defines a peak of each RCC.

3. The WCN of claim 2, wherein:

each estimated true range is based on a noise floor (NF) of each RCC.

4. The WCN of claim 3, wherein:

each estimated true range is defined by a threshold that is based on each of a predetermined amount of standard deviation and a maximum value of a predetermined number of phase measurement samples as measured along the NF.

5. The WCN of claim 4, wherein:

the threshold is defined as at least the sum of the maximum value and the predetermined amount of the standard deviation of the predetermined number of phase measurement samples as measured along the NF.

6. The WCN of claim 4, wherein:

each RCC defines a threshold crossing index (TCI) whereat the RCC first crosses the threshold.

7. The WCN of claim 6, wherein:

each estimated true range is further defined by an offset amount (OA) that compensates for windowing of each of the phase measurement samples corresponding to signals exchanged between the WCN and each of the plurality of other wireless communications nodes.

8. The WCN of claim 7, wherein:

the OA is based on windowing of each of the phase measurement samples corresponding to signals exchanged between the WCN and each of the plurality of other wireless communications nodes.

9. The WCN of claim 8, wherein:

each estimated true range is defined, with respect to the RCC of each of the plurality of other wireless communications nodes, as the sum of each TCI and each OA.

10. The WCN of claim 9, wherein:

the correspondence of the coordinate location of the WCN to each of the estimated true ranges to each of the plurality of other wireless communications nodes is defined by a minimization of error that, with respect to maximum ranges to each of the plurality of other wireless communications nodes, each true range is within each maximum range.

11. The WCN of claim 10, wherein:

the minimization of error is defined according to a constrained gradient descent for each estimated true range relative to each maximum range.

12. The WCN of claim 11, wherein:

the wireless communications node comprises any one of a mobile end node (EN), a stationary reference point (RP) that is not configured to connect to a network, and an access point (AP) that is configured to connect to the network.

13. The WCN of claim 12, wherein:

in response to the wireless communications node comprising a mobile EN, the mobile EN further comprises an accelerometer.

14. The WCN of claim 13, wherein:

based on an accelerometer reading of zero being associated with the mobile EN, the mobile EN is configured to update each maximum range to each of the plurality of other wireless communications nodes in order to update the location zone.

15. A method of locating a wireless communications node, comprising:

receiving, at a first wireless communications node, beacon advertisement messages, each of which is transmitted from a respective one of a plurality of second wireless communications nodes;

generating, at the first wireless communications node, range correlation curves (RCCs) each representing phase measurement samples versus estimated range as to wireless communications signals exchanged between the first wireless communications node and the plurality of second wireless communications nodes subsequent to receipt by the first wireless communications node of the beacon advertisement messages;

determining, based on the RCC for each of the plurality of second wireless communications nodes, a respective maximum range of the first wireless communication node to a respective one of the plurality of second wireless communications nodes;

determining, based on the RCC for each of the plurality of second wireless communications nodes, an estimated true range of the first wireless communications node to a respective one of the plurality of second wireless communications nodes, wherein each maximum range comprises a magnitude that exceeds each estimated true range;

generating, based on coordinate information corresponding to each of the plurality of second wireless communications nodes at a respective maximum range thereof, a location zone comprising the estimated true ranges; and determining a coordinate location of the first wireless communication node within the location zone that corresponds to the estimated true ranges.

16. The method of claim 15, wherein:

each maximum range defines a peak of each RCC.

17. The method of claim 16, wherein:

each estimated true range is based on a noise floor (NF) of each RCC.

18. The method of claim 17, wherein:

each estimated true range is defined by a threshold that is based on each of a predetermined amount of standard deviation and a maximum value of a predetermined number of phase measurement samples as measured along the NF.

19. The method of claim 18, wherein:

the threshold is defined as at least the sum of the maximum value and the predetermined amount of standard deviation of the predetermined number of phase measurement samples as measured along the NF.

20. The method of claim 18, wherein:

each RCC defines a threshold crossing index (TCI) whereat the RCC first crosses the threshold.

21. The method of claim 20, wherein:

each estimated true range is further defined by an offset amount (OA) that compensates for windowing of each of the phase measurement samples corresponding to signals exchanged between the WCN and each of the plurality of second wireless communications nodes.

22. The method of claim 21, wherein:

the OA is based on windowing of each of the phase measurement samples corresponding to signals exchanged between the wireless communications node and each of the plurality of second wireless communications nodes.

23. The method of claim 22, wherein:

each estimated true range is defined, with respect to the RCC of each of the plurality of second wireless communications nodes, as the sum of each TCI and each OA.

24. The method of claim 23, wherein:

the correspondence of the coordinate location of the first wireless communications node to each of the estimated true ranges to each of the plurality of second wireless communications nodes is defined by a minimization of error that, with respect to maximum ranges to each of the plurality of second wireless communications nodes, each true range is within each maximum range.

25. The method of claim 24, wherein:

the minimization of error is defined according to a constrained gradient descent for each estimated true range relative to each maximum range.

26. The method of claim 25, wherein:

the first wireless communications node comprises any one of a mobile end node (EN), a stationary reference point (RP) that is not configured to connect to a network, and an access point (AP) that is configured to connect to the network.

* * * * *